July 1, 1924.

J. A. NORDIN 1,499,685

FRICTION LOCK FOR MEAT HOLDERS IN MEAT SLICING MACHINES

Filed May 5, 1923

Inventor:
J. A. Nordin
By Marker Clerk
Atty's.

Patented July 1, 1924.

1,499,685

UNITED STATES PATENT OFFICE.

JOSEF AUGUST NORDIN, OF STOCKHOLM, SWEDEN, ASSIGNOR TO AKTIEBOLAGET STILLE-WERNER, OF STOCKHOLM, SWEDEN, A CORPORATION OF SWEDEN.

FRICTION LOCK FOR MEAT HOLDERS IN MEAT-SLICING MACHINES.

Application filed May 5, 1923. Serial No. 636,907.

*To all whom it may concern:*

Be it known that I, JOSEF AUGUST NORDIN, a subject of the King of Sweden, residing at Gotgatan 14, Stockholm, in the Kingdom of Sweden, have invented certain new and useful Improvements in Friction Locks for Meat Holders in Meat-Slicing Machines, of which the following is a specification.

The present invention relates to meat-slicing machines of the type, in which the meat, etc., is held on the table by means of a holder pivotally connected to a yoke or the like supporting the same, said yoke being slidably guided on two uprights. The yoke is provided with a friction lock cooperating with one of the uprights, so that said yoke will be automatically locked in adjusted position.

The present invention has for its purpose to provide an improvement of the friction lock mentioned above so that the same does not in any way prevent the shifting of the yoke towards the table but at the same time locks the yoke in a reliable manner so that the latter cannot be shifted in the opposite direction unless the friction lock be actuated by hand.

Figure 1:
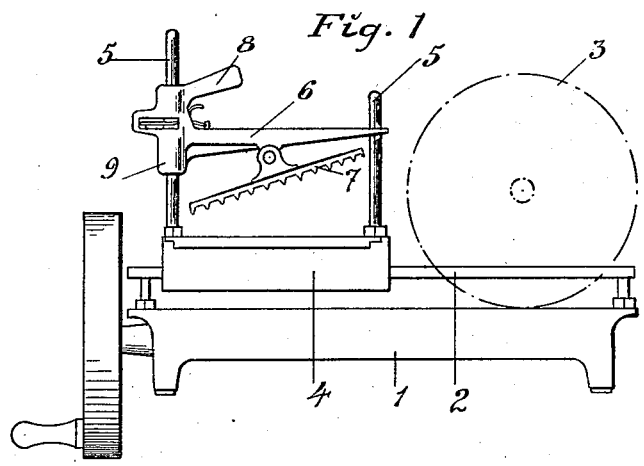
Figure 2:
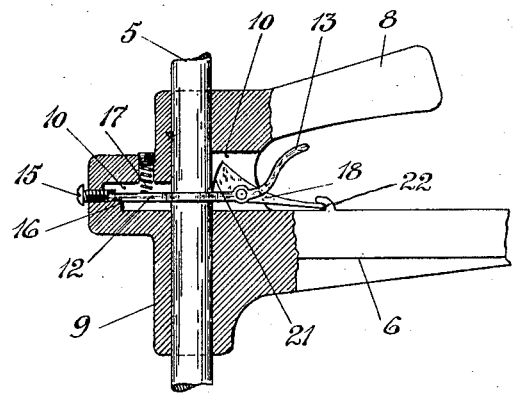
Figure 3:
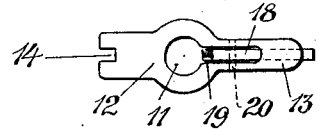

The invention is illustrated in the accompanying drawing, in which Fig. 1 is a side view of a meat-slicing machine of the type stated above. Fig. 2 is a side view, partly in section, on a larger scale, of the part of the yoke, in which the friction lock is mounted, and Fig. 3 is a top view of the friction lock.

On rods 2 supported by the frame 1 of the machine a slide 4 is reciprocated longitudinally of the disk knife 3 in the ordinary manner and provided with a table for meat or the like. Fixed to said table are two uprights 5, on which a yoke 6 is slidably mounted. Pivotally connected to the yoke 6 is a holder 7 holding the meat. One end of said yoke 6 is made in the form of a guiding sleeve 9 provided with a handle 8 and slid on one of the uprights 5. The other end of the yoke is provided with a hole for the other upright 5.

The friction lock in accordance to this invention is arranged in a recess 10 in the sleeve 9 and comprises a plate 12 or the like provided with a hole 11 for the upright 5 and with a finger piece 13 located below the handle 8. The plate is further provided with a recess 14 adapted to engage a screw-threaded pin 15, which is screwed into the sleeve 9. Provided in the recess 10 is a shoulder 16, against which the plate bears, while a spring 17 tends to give said plate an oblique position and thus force the finger piece 13 downwards from the handle 8. In this case, however, a member eccentrically pivoted to the plate 12 will be forced against the upright 5 and consequently lock the plate to said upright. The eccentric member comprises a lever 18 or the like being located in a recess 19 branched from the hole 11 in the plate 12, said plate being provided with a fulcrum pin 20 for the lever. The end of the lever 18 opposite to the upright 5 has the form of a cam face bearing against said upright but eccentrically located relatively to the fulcrum pin 20. The other end of the lever 18 extends under a projection or a notch 22 on the yoke 6.

An upward pressure actuated on the yoke obviously increases the locking capacity of the friction lock as the cam face 21 tends to rotate counter clock-wise. The meat located under the holder 7 is consequently fixed in a perfectly reliable manner on the table, which is of course of great importance. The shifting of the yoke downwards is not in any way prevented by the friction lock, which will by said shifting be automatically disengaged on account of the cam face 21 being rotated clock-wise, so that the pressure of the latter against the upright will cease.

By adjusting the yoke vertically it is only necessary to grasp the handle 8 and by means of a finger of the hand actuate the finger piece 13 towards the handle, the cam face 21 thus being forced to rotate clock-wise so that the friction against the upright will lessen or cease. As soon as the finger piece is released the friction lock will be reengaged and hold the yoke in adjusted position. The notch 22 serves to hold one end of the lever 18 in a certain position.

I claim:

1. In a meat slicing machine the combination with a table, uprights on the table and a yoke slidably mounted on the uprights, of a friction lock mounted on the yoke for cooperating with one of said uprights including a manually operated spring controlled plate having an opening which is arranged about one of the uprights, and an eccentric member cooperating with the said upright and normally arranged in slight frictional engagement with the upright so that the yoke may be shifted only towards the table and can be only moved or shifted in the opposite direction upon the manual operation of the plate.

2. An arrangement as claimed in claim 1, wherein cooperating handle portions are provided respectively on the yoke and on the plate.

3. An arrangement as claimed in claim 1, wherein the yoke is provided with a notch and wherein the eccentric member comprises a lever pivotally connected to the plate, one end of said lever being in the form of a cam bearing against the adjacent upright and eccentrically supported relatively to the coupling pin of the lever and the other end of the lever being engaged in the notch in the yoke, substantially as and for the purposes set forth.

4. In a meat slicing machine the combination with a table, uprights thereon and a yoke provided with openings in its opposite end portion for slidable engagement with the uprights and also provided near one end portion with a recess traversing the opening, of a plate arranged horizontally in the recess having one end secured therein and the outer portion provided with an opening to permit of the arrangement of the plate about the adjacent upright, a spring tensioned against the upper surface of the plate, a lever pivotally connected to the outer portion of the plate, the yoke being provided with a recess for accommodating the outer end of the lever, a cam provided on the inner end of the lever and normally arranged in slight frictional engagement with the adjacent upright so as to permit of the downward shifting of the yoke on the uprights and preventing upward movement of the plate, and cooperative handle portions provided on the yoke and on the plate for moving the plate against the tension of the spring and for raising the cam carrying lever out of contact with the upright to permit upward movement of the yoke, substantially as and for the purposes set forth.

In testimony whereof I have affixed my signature in presence of two witnesses.

JOSEF AUGUST NORDIN.

Witnesses:
    STURE GVIDINGER,
    EDWARD LARSON.